June 14, 1932.                 E. J. CLYNCH                 1,862,660
GAS FURNACE
Filed May 12, 1930                 2 Sheets-Sheet 2
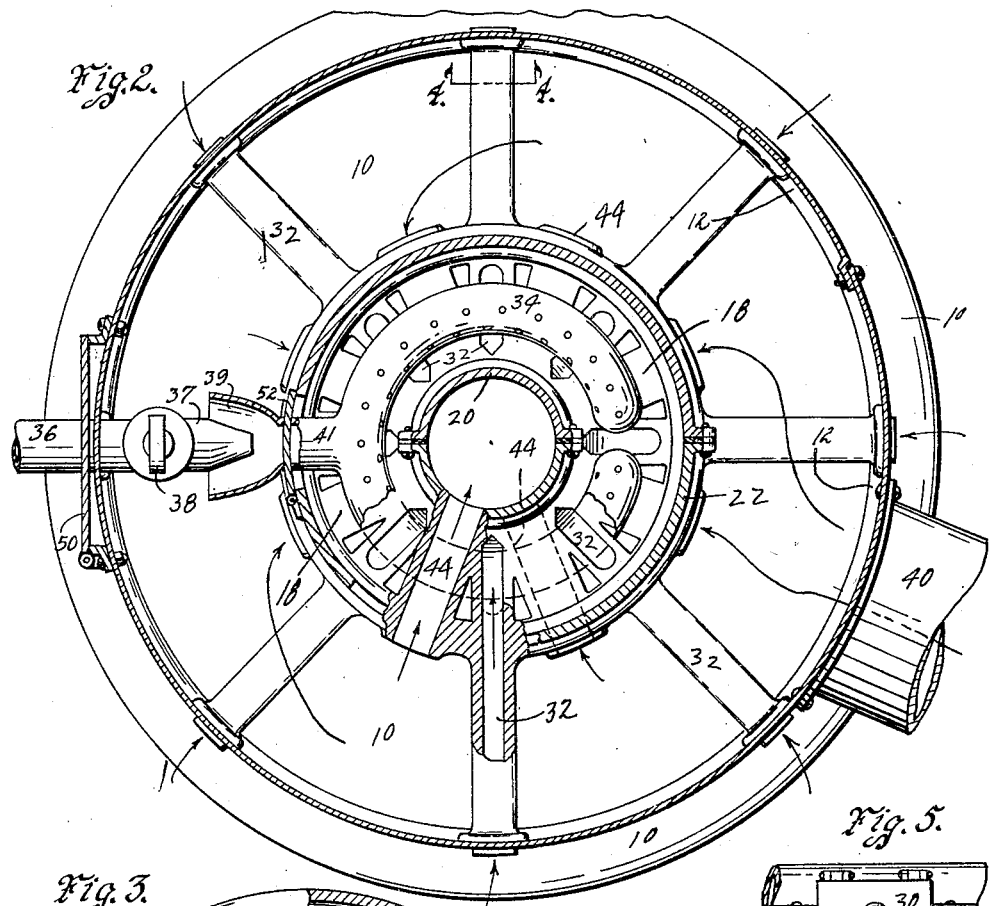
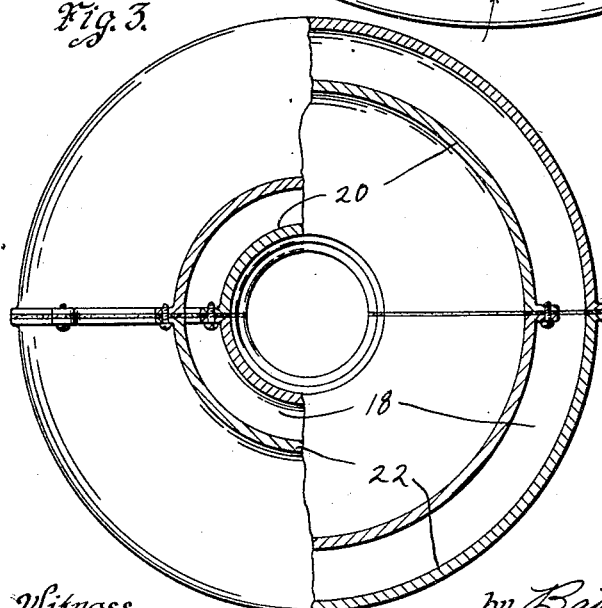
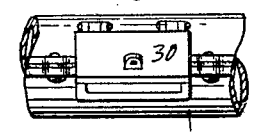
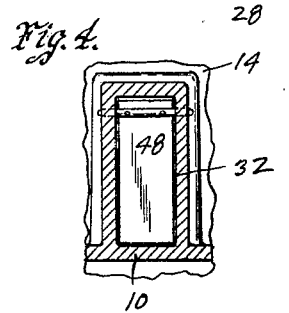
Inventor
~Edward J. Clynch~
by Bair, Freeman & Sinclair
Attorneys
Witness
H. S. Menzenmaier Patented June 14, 1932

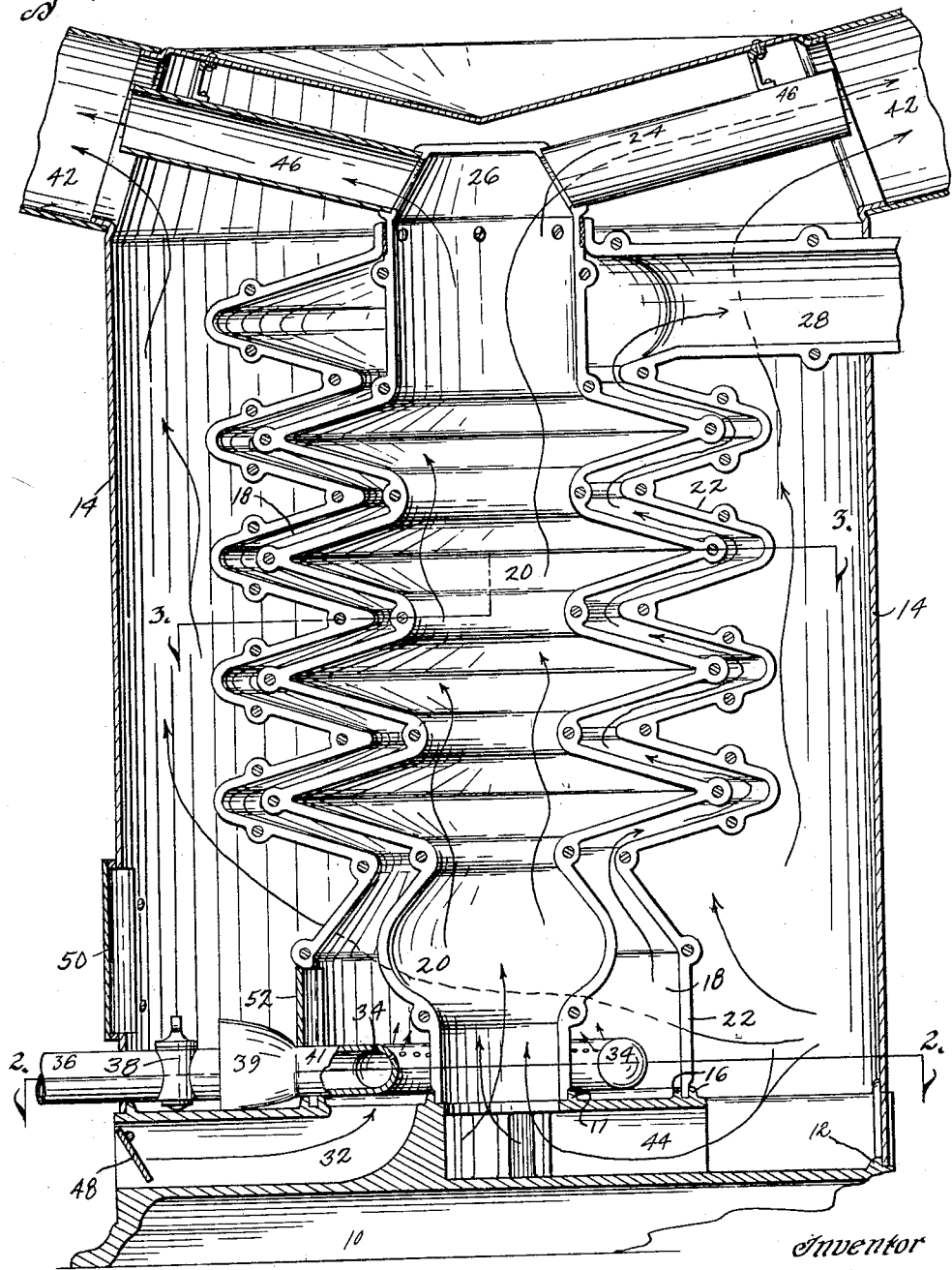

1,862,660

UNITED STATES PATENT OFFICE

EDWARD J. CLYNCH, OF DOWAGIAC, MICHIGAN

GAS FURNACE

Application filed May 12, 1930. Serial No. 451,689.

The object of my invention is to provide a gas furnace which is simple, durable and comparatively inexpensive to manufacture.

Still a further object is to provide a furnace having a combustion chamber with a heat generator therein, an interior air chamber being provided within the combustion chamber and an exterior chamber being provided outside of the combustion chamber, air being admitted to the bottom of both air chambers and discharged from the tops thereof, the air from the interior air chamber being discharged through a Venturi discharge pipe into a hot air discharge pipe for the exterior air chamber.

Still a further object is to provide a combustion chamber consisting of a vertically arranged inner and outer wall, both deeply corrugated to form a tortuous path for the products of combustion from the heat generator whereby the flow of air along the inner and outer walls may collect all the available heat and thus effect the greatest economy in the consumption of fuel.

Still a further object is to include in the furnace construction a base member provided with a plurality of conduction passageways for conducting air from the exterior of a casing which surrounds the combustion chamber to the heat generator and for conducting air from outside the outer wall to inside the inner wall of the combustion chamber.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a vertical sectional view through a furnace embodying my invention.

Figure 2 is a horizontal sectional view on the line 2—2 of Figure 1 showing the gas burner or heat generator in plan view and illustrating the air conducting passageways, some in section and some in plan view.

Figure 3 is a sectional view on the line 3—3 of Figure 1 illustrating the construction of the combustion chamber and its inner and outer walls.

Figure 4 is a sectional view on the line 4—4 of Figure 2 illustrating one of the air conducting passageways and a damper therein; and Figure 5 is a plan view of a chimney connection between the combustion chamber and a chimney.

On the accompanying drawings I have used the reference numeral 10 to indicate generally a base member. The base member 10 is disk shaped and is provided with a peripheral flange 12 around which fits a vertical tubular casing member 14. The casing member and the base member may be cemented or otherwise sealed relative to each other.

The base 10 is provided with an annular double flange 16 and a smaller annular flange 17. A combustion chamber 18 is formed of an inner wall 20 and an outer wall 22, both vertically tubular in shape and deeply corrugated as best shown in Figure 1. The lower end of the outer wall 22 rests between the flanges 16 and may be cemented therein, while the lower end of the inner wall 20 is cemented inside the flange 17. Thus the inner wall 20 and the outer wall 22 are supported on the base 10.

Both the inner and outer wall are preferably formed in two halves and bolted together as best shown in Figure 3 with a gasket or cement between them.

The inner wall 20 is provided at its upper end with a tubular neck 24 and a cone shaped head 26. The upper end of the outer wall 22 is provided with a chimney connection 28 having a draft check door 30 as shown in Figure 5.

The combustion chamber 18 formed between the walls 20 and 22 receives air from outside the casing 14 through conducting passageways 32. The passageways 32 are formed in the base 10 and extend from the exterior of the casing 14 to the interior of the combustion chamber as shown at the lower left side of Figure 1 and in section in Figure 2. A plurality of these passageways 32 is provided for supplying air to a burner 34. The burner 34 is adapted to burn gas or other fuel supplied to it through a pipe 36 and controlled by a valve 38. A nozzle 37 discharges the gas thru a funnel 39 into a pipe 41 connected with the burner 34. Primary air entering the funnel 39 is thus introduced into the burner 34. The plurality of passageways 32 supply additional or secondary air to all parts of the burner 34 to effect greatest efficiency in combustion regardless of cellar drafts or the position of the furnace with relation to the walls of the basement.

Communicating with the interior of the casing 14 is a cold air pipe 40, while adjacent the upper end of the casing, hot air discharge pipes 42 are provided as in the ordinary type of hot air furnace having a casing. The cold air pipe 40 delivers air from rooms to be heated to the lower part of the casing 14, while the pipes 42 deliver heated air to the rooms. Thus, incoming air from the pipe 40 contacts with the outside of the outer wall 22 from which heat is radiated because of the products of combustion passing upwardly through the combustion chamber 18 from the burner 34 to the chimney connection 28. This heated air is discharged through the hot air pipes 42.

Communication between the exterior air chamber just referred to and the interior air chamber within the inner wall 20 is provided by passageways 44 extending from the outside of the outer wall 22 to the inside of the inner wall 20, as shown at the lower right of Figure 1 and in section in Figure 2. Thus a portion of the air coming from the cold air pipe 40 passes through the passageway 44 and is heated by the heat radiated from the inner wall 20. The air so heated is then discharged through the neck 24 and head 26 and into what I term as "Venturi" discharge pipes 46. These discharge pipes are somewhat smaller than the hot air discharge pipe 42 and are directed into the pipes 42 in such a way that the air coming through the Venturi pipes 46 will draw air from the exterior air chamber and aid circulation. The reason for this is that the inner wall 20 is hotter than the outer wall 22 since it has less radiating surface and is confined within the combustion chamber rather than being on the outside of it. Thus the air passing therethrough will be heated and the hotter the air is, the more it expands and the more the velocity of it is increased.

For controlling the heat generators 34 an ordinary check draft 30 may be used in conjunction with automatic damper plates 48 which are freely pivoted so that they will swing to the operative position illustrated in Figure 1 during normal operation of the furnace. When the draft chimney increases they will swing farther inward and vice versa. Suitable doors 50 and 52 may be provided for gaining access to the valve 38 and to the combustion chamber 18.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a furnace of the character disclosed, a combustion chamber, a gas burner therein, an interior air chamber within said combustion chamber, an exterior air chamber surrounding said combustion chamber, means for supplying air to the exterior air chamber, radial conductor means, circumferentially spaced for conducting air from the exterior air chamber to the interior air chamber, a hot air discharge pipe and means for discharging such air, after contact with the inner and outer walls of said combustion chamber, into said hot air discharge pipe.

2. In a furnace construction, a combustion chamber having an outer wall and an inner wall, said inner wall forming an interior air chamber within the combustion chamber, a casing surrounding said combustion chamber, said casing forming an exterior air chamber surrounding said combustion chamber, means for admitting air to said casing, radially extending conductors for admitting air from within said casing to within said interior air chamber, hot air discharge pipes extending from said casing, said interior and exterior air chambers being in communication therewith, and means for generating heat within said combustion chamber.

3. In a furnace construction, a combustion chamber having an outer wall and an inner wall, said inner wall forming an interior air chamber within the combustion chamber, a casing surrounding said combustion chamber, said casing forming an exterior air chamber surrounding said combustion chamber, means for admitting air to said casing and from within said casing to within said interior air chamber, hot air discharge pipes extending from said casing, said interior and exterior air chambers being in communication therewith, a burner within said combustion chamber and radial air conductors from the outside of said casing and upwardly extending through the bottom of said combustion chamber for supplying air to said burner from below the same.

4. A furnace construction comprising a base member, an inner tubular wall extending upwardly therefrom, an outer tubular wall extending upwardly therefrom, outside of said inner wall whereby to form a combustion chamber between said walls, a heat generator within said combustion chamber, a casing outside of said outer wall, the space inside the inner wall and between the outer wall and the casing forming respectively interior and exterior air chambers, and conductor passageways formed in said base from the exterior of said casing to the interior of said combustion chamber and extending upwardly through the bottom thereof.

5. A furnace construction comprising a base member an inner tubular wall extending upwardly therefrom, an outer tubular wall extending upwardly therefrom outside of said inner wall whereby to form a combustion chamber between said walls, a heat generator within said combustion chamber, a casing outside of said outer wall, the space inside the inner wall and between the outer wall and the casing forming respectively interior and exterior air chambers, conductor passageways in said base from the exterior of said casing to the interior of said combustion chamber and freely pivoted, automatically operated draft dampers in said passageways.

6. A furnace construction comprising a base member, an inner tubular wall extending upwardly therefrom, an outer tubular wall extending upwardly therefrom outside of said inner wall whereby to form a combustion chamber between said walls, a heat generator within said combustion chamber, a casing outside of said outer wall, the space inside the inner wall and between the outer wall and the casing forming respectively interior and exterior air chambers, and conductor passageways formed in said base from the exterior to the interior air chambers.

7. A furnace construction comprising a base member, an inner tubular wall extending upwardly therefrom, an outer tubular wall extending upwardly therefrom outside of said inner wall whereby to form a combustion chamber between said walls, a heat generator within said combustion chamber, a casing outside of said outer wall, the space inside the inner wall and between the outer wall and the casing forming respectively interior and exterior air chambers, conductor passageways formed in said base from the exterior to the interior air chambers, and conductor passageways formed in said base from the exterior of said casing to the interior of said combustion chamber.

8. A furnace construction comprising a base member, an inner tubular wall extending upwardly therefrom, an outer tubular wall extending upwardly therefrom outside of said inner wall whereby to form a combustion chamber between said walls, a heat generator within said combustion chamber, a casing outside of said outer wall, the space inside the inner wall and between the outer wall and the casing forming respectively interior and exterior air chambers, conductor passageways formed in said base from the exterior to the interior air chambers, conductor passageways formed in said base from the exterior of said casing to the interior of said combustion chamber and automatically operated draft dampers in said passageways.

9. In a furnace construction, a base, a combustion chamber thereon having inner and outer walls, a casing surrounding said outer wall and means in said base for admitting air from outside the casing to between said inner and outer walls, a burner in said combustion, chamber means for supplying fuel and primary air thereto, said first mentioned means for admitting air from outside the casing supplying secondary air to said burner.

10. In a furnace construction, a base, a combustion chamber thereon having separate, corrugated inner and outer walls, a casing surrounding said outer wall, means in said base for admitting air from outside the casing to between said inner and outer walls, and means in said base for admitting air from outside said outer wall to inside said inner wall.

11. In a furnace construction, a base, a combustion chamber thereon having inner and outer walls, a casing surrounding said outer wall, means in said base for admitting air from outside the casing to between said inner and outer walls, and an air discharge pipe from said casing.

EDWARD J. CLYNCH.